Dec. 19, 1961  M. F. ARMS ET AL  3,013,565
CORN SHELLER
Filed June 23, 1958  2 Sheets-Sheet 1
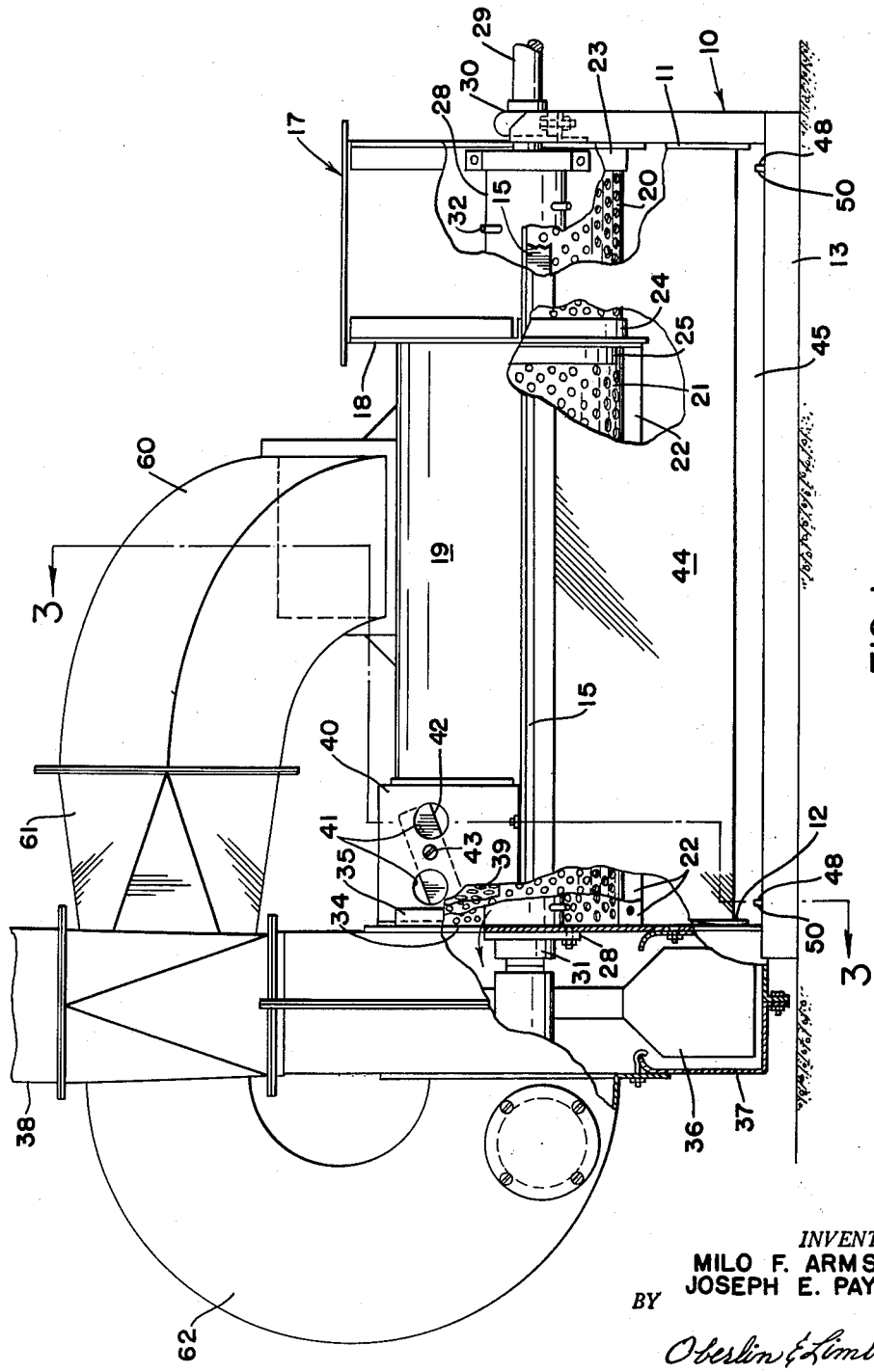
FIG. I
INVENTORS
MILO F. ARMS &
JOSEPH E. PAYTON
BY
Oberlin & Limbach
ATTORNEYS

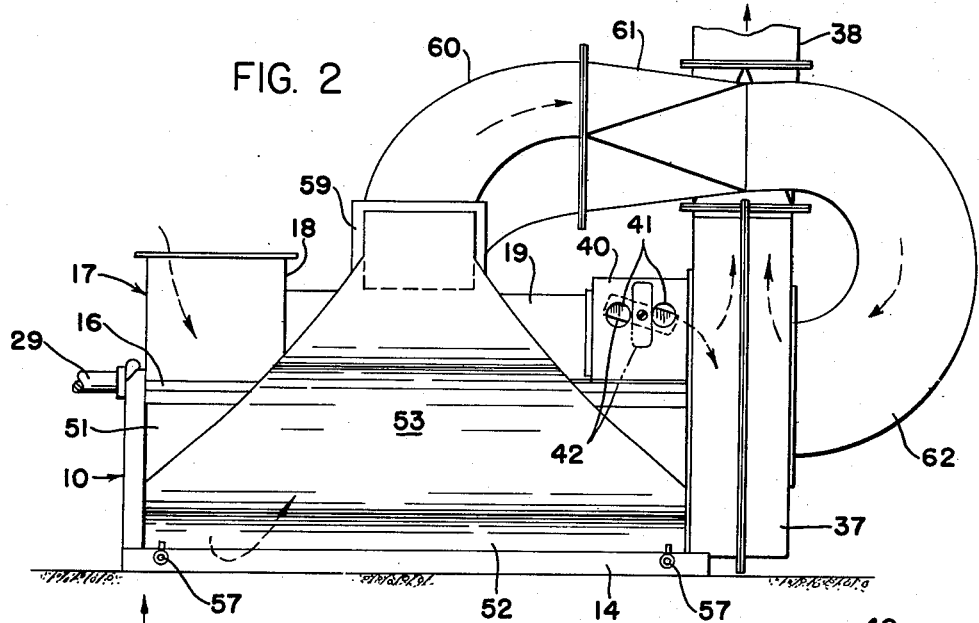
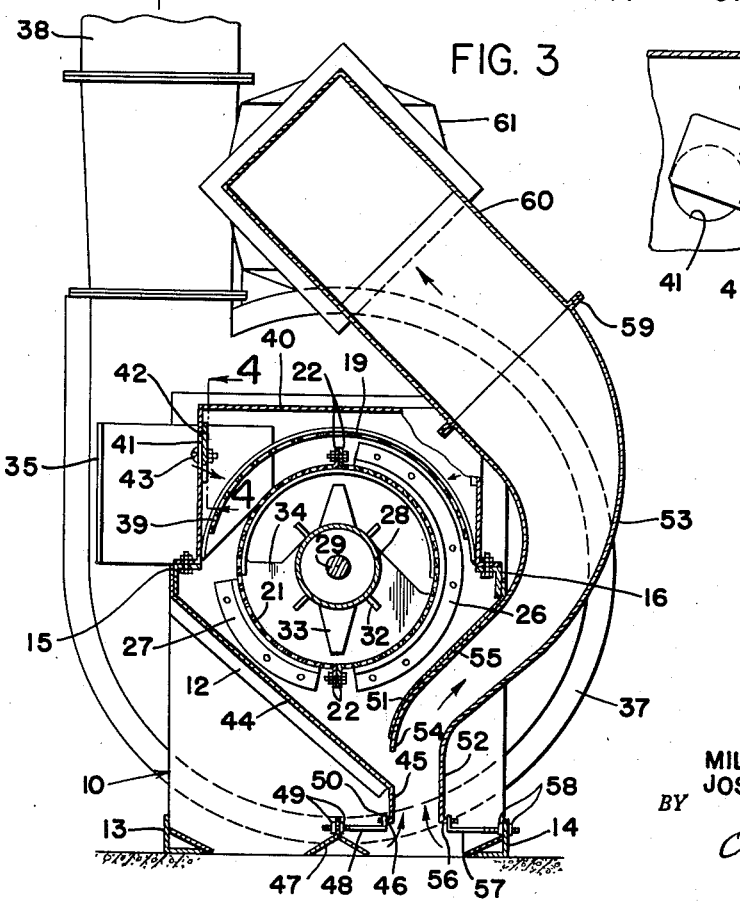
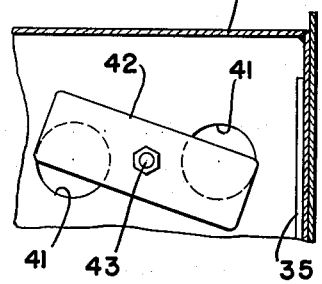

United States Patent Office 3,013,565
Patented Dec. 19, 1961

3,013,565
CORN SHELLER
Milo F. Arms, Parma, and Joseph E. Payton, Leesburg, Ohio, assignors to The C. O. Bartlett & Snow Company, Cleveland, Ohio, a corporation of Ohio
Filed June 23, 1958, Ser. No. 743,882
6 Claims. (Cl. 130—6)

This invention relates to an improved corn sheller of cylinder type equipped with a cob fan or blower for removing the cobs and husks as rapidly as the same are discharged from the shelling area.

In conventional shellers of this nature, the shelling area is defined by a substantially horizontal outer cylinder which is perforated, over at least the bottom half, in such manner that the shelled corn is discharged through the wall openings thus provided over the length of the cylinder, a bottom hopper being provided to direct the falling grains to suitable conveying or collecting devices. The actual shelling is accomplished within the outer cylinder by means of an inner rotating assembly of appropriate form, for example, an inner cylinder having teeth which project outwardly into an annular space provided between the inner and outer cylinders, and the ear corn is delivered to the assembly through an inlet chute or feed hopper leading to one end of the outer cylinder. With the shelled corn passing laterally through the perforated or screen portion of the outer cylinder, the cobs and husks advance to the opposite end where they are discharged through a cob opening, usually provided with an adjustable dam or door to regulate the size of this end discharge opening.

The cob blower is installed so that the cobs and husks thus discharged pass to the eye of the blower and a cob pipe is connected to the blower discharge to convey such material away from the sheller. The pipe may, for example, extend to a bin, storage pile or cob burner.

In such operation, the blower tends to draw air longitudinally through the outer cylinder, but this flow is impeded by the material within the same and normally blocking the inlet chute as well. As a result, the negative pressure created by the blower is not satisfied with air from the interior of the cylinder and a zone of such negative pressure extends into the discharge end portion of the shelling area. Some air entering the feed chute passes almost directly through the cylindrical screen, proceeds along the exterior thereof to the discharge end, and then re-enters the screen. Air will also be drawn from the shelled corn discharge chute into the sheller and through the screen at the negative pressure zone to proceed to the fan or blower.

There is, consequently, a considerable amount of air moving inwardly through the screen, and this flow entrains cob chaff, bits of husks, silk and other light trash particles unavoidably present in the shelled corn discharge. Such trash is thus carried against the exterior of the screen and accumulates thereon to the extent of actually blocking a significant area of the same. Such clogging or blocking of the shelled corn openings obviously reduces the efficiency of the machine, a certain amount of shelled corn which should have been discharged through the cylinder being carried along with the cob and husk discharge and thereby lost. The negative pressure zone within the cylinder has, moreover, been found to result in temporary accumulations of shuck against the end wall about the cob discharge opening.

The noted trash blockage of the exterior of the outer cylinder or screen is particularly evident where the cob blower is also used to create definite flow of air for cleaning the shelled corn as the same is discharged from the shelling area, since this arrangement requires a substantial opening to the atmosphere at the lower region of the sheller where the shelled corn passes from the machine. That is, the ingress of air at the bottom is facilitated, the connection from such cleaning zone to the blower necessarily being one producing suction and drawing air inwardly to flow through the falling grains of corn. In such case, there is an even greater flow of air toward the exterior of the screen, since a significant portion of the cleaning air inflow is diverted upwardly through the shelled corn hopper.

It has been proposed to minimize clogging of the screen by reducing the discharge opening for the cobs and husks deliberately to increase the congestion in the shelling area and thereby cut down the air flow from the outside to the inside of the screen. However, this expedient is completely unsatisfactory in shelling ear corn containing a high percentage of husks, such for example as Southern corn, and ineffective in operation at light feeding rates; even where some benefit is thus obtained with respect to blockage, the capacity of the apparatus is considerably reduced and the power consumption increased.

It is accordingly a primary object of our invention to provide a corn sheller of the type noted which is not only free of trash blockage of the screen but also eliminates congestion at the cob discharge opening to avoid the aforenoted reduction in capacity experienced in prior machines. As a matter of fact, our construction permits a larger cob opening to be used, whereby the shelling capacity is actually increased.

Another object is to provide such a sheller in which the cob blower can also be used efficiently for cleaning of the shelled corn, with the cleaning air flow being uniform and the freedom from screen blockage being maintained. In prior machines in which the cob blowers are also used for cleaning, as discussed, the congestion which occurs at the cob discharge openings affects the cleaning air flow by making the same fluctuate and become turbulent. For efficient cleaning, this flow should be as uniform as possible and such condition is provided in our new sheller.

It is also an object of our invention to improve the separation of the shelled corn from the cobs and husks in the shelling area when operating at relatively light feeding rates by reducing the tendency for more rapid movement of the cob, corn and husks to the end discharge opening which results when prior machines are thus operated.

It is a further object to provide such a corn sheller having adjustable control of the effective suction produced by the blower in the shelling area, such control being realized easily and inexpensively, without reducing the efficiency of the blower in its principal function of disposing of the discharged cobs and husks.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a side elevational view of a corn sheller constructed in accordance with our invention, certain portions thereof being broken away to expose normally enclosed structure;

FIG. 2 is a further elevation on a reduced scale showing the side opposite the one illustrated in FIG. 1;

FIG. 3 is a transverse sectional view taken approximately on the line 3—3 in FIG. 1; and FIG. 4 is a partial section to an enlarged scale as viewed from the plane of the line 4—4 in FIG. 3.

Referring now to the drawings in detail, the illustrated machine is a cylinder type sheller comprising a floor-supported frame designated generally by reference numeral 10. A transverse vertical plate 11 is secured to the frame at one end and a second, similarly arranged plate 12 is provided at the opposite end, such plates defining the extent of the sheller proper. Two outboard structural members 13 and 14 extend longitudinally at the base or bottom of the frame from one end to the other and two further frame members 15 and 16 extend between the end plates, likewise at the sides of the assembly but at a predetermined elevation above the base.

A feed hopper 17 is provided at the first-mentioned end, with the upper portion of the plate 11, or an extension thereof, serving as the front of such hopper. The sides of the hopper, which is of course open at the top and bottom, are supported on the structural members 15 and 16 and preferably they converge somewhat in proceeding downwardly from the top. A back plate 18 completes the hopper, the same projecting upwardly from the plane of the side pieces 15 and 16. Extending from the back of the hopper to the opposite end plate 12, there is a semi-cylindrical cover or hood 19 having its edges supported on and secured to the elevated longitudinal frame members 15 and 16 to project upwardly with its axis extending longitudinally and substantially horizontally within the frame.

A semi-cylindrical upturned screen 20 is positioned beneath the open bottom of the feed hopper and, in the illustrated embodiment, a full cylindrical screen 21 extends from the hopper back to the removed end plate 12. Both such screens are preferably made from perforated plate, with the main screen 21 comprising two such plates of 180° extent having outwardly directed longitudinal flanges 22 which are bolted or otherwise held together. The outer or front end of the short screen 20 is supported by a curved angle 23 secured to the end plate 11 and another such angle 24 is provided at the inner end of this screen. One or more similarly formed angles 25 embrace the forward end of the large screen 21 and these are fastened to the inner angle 24 of the short screen at the lower portion and to the hopper back plate 18 for support at the upper section. The other end of the large screen is attached and supported by angles 26 and 27 secured to the end plate 12, as shown most clearly in FIG. 3. For a purpose to be explained below, there is no such support angle embracing roughly the upper left quadrant of the screen as viewed in this figure.

The main screen 21 is concentric with and spaced inwardly of the cover, and a rotary shelling cylinder 28 is mounted co-axially within the former in inwardly spaced relation. This shelling cylinder, which extends as well into the feed hopper 17, is fixed on a drive shaft 29 supported at the front end of the machine in a pillow block 30 and projecting therefrom for connection to a suitable drive motor, not shown. The other end of the shaft projects through the end plate 12 and is supported in a flange block 31 fastened to the rear face of such plate. A plurality of teeth 32 and a lesser number of relatively large lugs 33 are spaced circumferentially and longitudinally on the inner cylinder or rotor 28, it being understood that these elements upon rotation agitate the charge of ear corn fed to the sheller and thus provide the shelling action. It is preferred that the teeth be arranged helically on the inner cylinder, to assist in advance of the material longitudinally through the annular space between the same and the stationary screen, particularly in operation at light feeding rates.

The perforations in the screen sections are of course of such size as to pass grain corn, and in the machine we have illustrated, the grains can be expelled over the entire circumference of the main screen by driving the rotor at a speed sufficient ot provide centrifugal expulsion, rather than relying solely on gravity discharge.

The rear end plate 12 of the sheller is formed with a cob and husk discharge opening 34 generally coincident with the upper half of the annular space between the outer screen and rotor, the specific configuration being clearly shown in FIG. 3, and an adjustable cob dam 35 is slidable against the forward face of such end plate in a slot or cut-out formed in the end of the screen over the aforementioned upper left quadrant. A screen support angle in this region would of course be obstructive and is therefore omitted. The dam has its inner lower corner cut away for increased clearance, and it will be seen that it is movable partially to block the cob and shuck opening in varying adjusted degrees.

A cob fan 36 is mounted on the projecting rear end of the drive shaft 29 and enclosed by a scroll housing 37 with the cob discharge opening 34 leading directly to the open eye of the fan at the machine side of the same. This fan, having large blades, is capable of disposing of the cobs and husks thus received from the shelling area by blowing such material through appropriate pipe, indicated at 38, connected to its discharge and extending to some convenient removed location where there may, for example, be a bin, storage pile or cob burner.

As discussed at the outset, and as will now be apparent, this blower creates considerable suction at the cob discharge opening, and the only way for air to enter at this side is to proceed from the interior of the cylinder or screen 21. Since the material being processed impedes air flow through the inlet chute and longitudinally through the cylinder, a substantial amount of air is drawn inwardly through the screen from the exterior of the same and such flow, particularly in the lower region where the shelled corn and small trash particles are being discharged, has the effect of plastering such trash against the exterior of the screen and obscuring openings in the same. This blocking of the screen occurs first at the extreme end of the same adjacent the blower and as the effective end zone for entry of this air consequently moves back away from the actual screen end, the area of trash accumulation progressively increases along the exterior of the screen. We eliminate such trash blockage, and also husk accumulation about the cob discharge opening, by providing auxiliary means for satisfying the negative pressure at the discharge end of the cylinder 21.

We thus provide a series of perforations 39 in the top hood 19 over an end portion adjacent the blower. This perforated section of the hood is enclosed by a breather box 40 fitted over the same and closed except for a pair of air inlets 41 at each side. An elongated plate 42 is pivotally connected at its center 43 to the box side wall between each pair of such inlets and overlies the inner surface of the wall, these plates thereby forming adjustable baffles operative variably to obscure the inlets and regulate the amount of air taken in through the breather box. Such air will pass through the hood perforations 39 and the screen 21 to the fan.

It is to be noted that this inflow provided by the breather box traverses a relatively clean portion of the space about the screen 21, that is, an external region which is normally free of significant amounts of chaff and other trash. Some of the air thus admitted will flow over the top exterior of the screen, downwardly to either side of center, and such currents preclude trash from floating or being carried upwardly into such upper space. The flow is therefore reliable, and actual operation of a machine constructed in the manner described and illustrated has conclusively demonstrated that such controlled admittance of fresh air not only eliminates the usual trash blockage at the lower portion but sweeps husk accumulating around the cob discharge opening through the same. The latter effect is to a degree independent of the cob dam position.

The improved corn sheller thus far described is essentially a complete operative unit, with only a suitable form of shelled corn hopper being added at the bottom to contain the falling grains of corn and deliver the same to conveyor or other collecting devices which may be employed. However, in the preferred embodiment which has been illustrated, an air cleaner for the shelled corn, utilizing the cob blower to create the necessary draft, is also included.

Such further structure comprises an inclined skirt 44 extending between the end plates 11 and 12 and closing one side of the lower portion of the sheller. Such skirt is secured at its upper edge to the frame member 15 and extends downwardly and inwardly, as best shown in FIG. 3, beyond the bottom center of the cylinder or screen. At this last location, the skirt is bent downwardly to form a substantially vertical, longitudinally extending wall section 45, and there is an outurned flange 46 at the bottom margin of this section. The ends of such skirt, respectively against the end plates, are unsecured, while the bottom longitudinal flange 46 is adjustably fastened to a central longitudinal frame member 47. Such fastening is accomplished by means of bolts 48 passing through the frame member 47, with stop nuts 49 at each side of the same, and having upturned outer ends 50 engaged in holes provided therefor in the skirt bottom flange. The lower portion of the skirt, particularly the substantially vertical wall section 45 of the same can thus be laterally shifted by adjusting these connecting bolts.

A longitudinal baffle 51 is provided as a lower closure at the opposite side of the sheller, this baffle being secured at its upper margin to the frame member 16 and likewise being inclined inwardly. The inner and lower marginal portion of the baffle is somewhat curved transversely and its edge is substantially superimposed over the terminal portion of the skirt 44. Baffle 51 thus defines with such skirt a form of shelled corn hopper for containing and directing the falling grains, which will be guided to pass through the elongated, relatively narrow space between the inner edge of the baffle and the edge of the inclined portion of the skirt below the same.

The shelled corn cleaner is also located at such other side of the sheller and comprises an outer side wall having a substantially vertical lower section 52 extending from one end plate to the other in spaced opposition to the lower wall section 45 of the skirt. The outer wall section 52 extends higher than such skirt wall section and then merges into an outwardly and upwardly curved section 53 of general triangular shape. The curvature of this section places the same substantially outwardly of the sheller frame and its upper end is appreciably above the cover 19 of the sheller.

The cleaner has an inner side wall with its lower edge 54 approximately at the corresponding edge of baffle 51 and thereby also being spaced above the substantially vertical wall section 45 of the skirt. The main portion 55 of this wall curves outwardly and upwardly against baffle 51 and about the sheller frame to a somewhat lesser degree than the outer side wall of the cleaner, so that the space defined by the inner and outer walls, in transverse section, increases when proceeding upwardly from the open bottom of the cleaner. The ends of the cleaner, that is, the front and rear with respect to the machine, are of course closed.

The outer side wall of the cleaner is also provided with an outurned bottom flange 56 and such flange is adjustably secured to the base frame member 14 by bolts 57 and stop nuts 58 in the same manner that the bottom of the skirt is secured. The lower end section 52 of such cleaner wall is therefore similarly laterally adjustable.

This cleaner is connected at its upper end 59 to the fan 36 by means of an elbow duct 60, transition section 61, and a further elbow 62 extending from the latter to the eye of the blower at the rear or outer side of the same.

The fan is thus operative to draw air in through the longitudinally extending opening defined by the spaced lower sections of the cleaner outer wall and the skirt, and it is through such opening that the shelled corn falls from the machine after being contained and directed cooperably by the skirt and opposed baffle. Such air flow is opposite to the direction of movement of the corn and will obviously pick up and carry chaff and other light trash particles mingled with the grains as discharged from the shelling area. By virtue of the adjustable bolt fastening of the lower portions of the skirt and outer cleaner wall, the width of this opening can be varied to control the volume and velocity of the cleaning air flow.

Although some air may still be diverted from the cleaner into the enclosure surrounding the cylinder 21, this flow is not significant due to the intake provided by the breather box described and consequent reduction of the negative pressure at the discharge end of the cylinder. Moreover, since congestion at the cob discharge opening is eliminated, the inflow of air to the cleaner is substantially uniform and free of turbulence, and it has been found that larger than normal cob discharge openings can be used, with increase in the capacity of the sheller.

The improved efficiency of our new sheller, both with and without the cleaner section, does not require that the main screen be perforated over its entire circumferential extent, nor is it necessary to mount the cob blower directly on the shaft of the sheller. The term "screen" as used herein will be understood to mean any member having a multiplicity of openings, regardless of the particular manner in which the same may be formed.

Other modes of applying the principle of the invention may be employed, change being made as regards the details described, provided the features stated in any of the following claims or the equivalent of such be employed.

We, therefore, particularly point out and distinctly claim as our invention:

1. A corn sheller comprising an enclosure including hood and hopper means and end plates, rotary shelling means within said enclosure, screen means in the enclosure beneath said rotary shelling means, said hood means adjacent one of its ends being provided with air inlet openings, and exhaust means operatively connected to said enclosure through an end thereof adjacent the air inlet openings.

2. A corn sheller as set forth in claim 1 including means for regulating the effective size of the air inlet in the hood means.

3. A corn sheller as set forth in claim 1 wherein the shelling means is mounted on a shaft extending through the enclosure, and said exhaust means comprises a cob blower mounted on said shaft.

4. A corn sheller as set forth in claim 3 including means for regulating the effective size of the air inlet in the hood means.

5. A corn sheller as set forth in claim 1 including a shelled corn cleaner having an inlet in proximity to the outlet of said hopper means, said cleaner being operatively connected to said exhaust means.

6. A corn sheller as set forth in claim 5 wherein the inlet of said shelled corn cleaner is adjustable to vary the effective size of the same.

References Cited in the file of this patent

UNITED STATES PATENTS

| | | |
|---|---|---|
| 273,113 | Love | Feb. 27, 1883 |
| 2,073,742 | Gilson | Mar. 16, 1937 |
| 2,129,894 | Weinhold | Sept. 13, 1938 |
| 2,443,031 | Gerber | June 8, 1948 |
| 2,849,004 | McCreery et al. | Aug. 26, 1958 |
| 2,898,921 | Bryant | Aug. 11, 1959 |

FOREIGN PATENTS

| | | |
|---|---|---|
| 701,169 | Great Britain | Dec. 16, 1953 |